United States Patent [19]
Lin et al.

[11] Patent Number: 5,944,328
[45] Date of Patent: Aug. 31, 1999

[54] CHUCK

[75] Inventors: Yuan-Ho Lin, Hsien; Wen-Chin Kuo, Taichung, both of Taiwan

[73] Assignee: Chum Power Machinery Corp., Taichung, Taiwan

[21] Appl. No.: 09/026,783

[22] Filed: Feb. 20, 1998

[51] Int. Cl.$^6$ .................................................. B23B 31/12
[52] U.S. Cl. ............................................ 279/62; 279/902
[58] Field of Search .............................. 279/61, 62, 902

[56] References Cited

U.S. PATENT DOCUMENTS

| | | | |
|---|---|---|---|
| 5,348,318 | 9/1994 | Steadings et al. | 279/902 |
| 5,553,873 | 9/1996 | Salpaka et al. | 279/902 |
| 5,669,616 | 9/1997 | Ho | 279/62 |

*Primary Examiner*—Steven C. Bishop
*Attorney, Agent, or Firm*—Pro-Techtor International Services

[57] ABSTRACT

A chuck for holding a tool a central axis, comprising: a main body, surrounding the central axis and having a periphery passed through by several oblique guiding openings, which are symmetrically arranged around the central axis; several jaws, gliding in the guiding openings and having a plurality of teeth; a threaded ring system, mounted on the main body, rotatable around the central axis, having an inner periphery with a thread, which engages with the teeth of the jaws, such that by turning the threaded ring system the jaws are driven towards the central axis or away therefrom; a holding ring for supporting the threaded ring system; a washer, mounted on the main body, for supporting the holding ring; and a front cover, covering the main body from the front end thereof, tightly linked to the holding ring and having an inner periphery with coupling elements, which engage with coupling elements on the threaded ring system, such that turning the front cover around the central axis drives a rotation of the threaded ring system around the central axis.

7 Claims, 3 Drawing Sheets

# CHUCK

BACKGROUND OF THE INVENTION

1. Field of the Invention

The present invention relates to an improved chuck, particularly to a keyless chuck which allows to hold and release a tool.

2. Description of Related Art

Electrically or pneumatically driven tools, like screw drivers, drills and grinding wheels, have been in use for a long time. The tools have shanks with various diameters and cross-sections. To hold those tools, chucks with adjustable widths are employed.

A conventional chuck has a main body containing three jaws, which are arranged obliquely around a central axis, separated by angles of 120 degrees. The jaws have threads which are engaged with the inner thread of a nut. Turning the nut by a toothed wheel on the main body causes the jaws to move closer together or farther apart for adjusting to different diameters of tools to be held.

Recently, keyless chucks have been designed. In a keyless chuck, a ball bearing reduces friction, when the nut is turned, allowing the user to turn the nut directly manually. Assembling the keyless chuck, especially the ball bearing, however, is not easy.

For this reason, the prior art has disclosed a chuck, wherein the nut and the ball bearing are connected by a coupling element, thus facilitating the assembly of the chuck.

However, there is still some need for improvement. For fixing the nut, the chuck has a holding ring, which is pressed on the main body or screwed thereon. This complicates the assembly of the chuck. Furthermore, the chuck has a front cover, pressed on the nut. Since the nut is not fixed, but slightly shaky, the front cover is easily shaken, too. When the front cover is set on the nut, additional pressure has to be applied. The inner diameter of the front cover is slightly smaller than the outer diameter of the nut, so the front cover is easily deformed or positioned wrongly.

SUMMARY OF THE INVENTION

An object of the present invention is to provide a chuck with reduced friction and increased torsional force.

Another object of the present invention is to provide a chuck with a reduced number of structural parts and easy assembly.

A further object of the present invention is to provide a chuck having jaws, which are accurately positioned with precise movements.

The present invention can be more fully understood by reference to the following description and accompanying drawings.

DETAILED DESCRIPTION OF THE PREFERRED EMBODIMENTS

Figure 1:
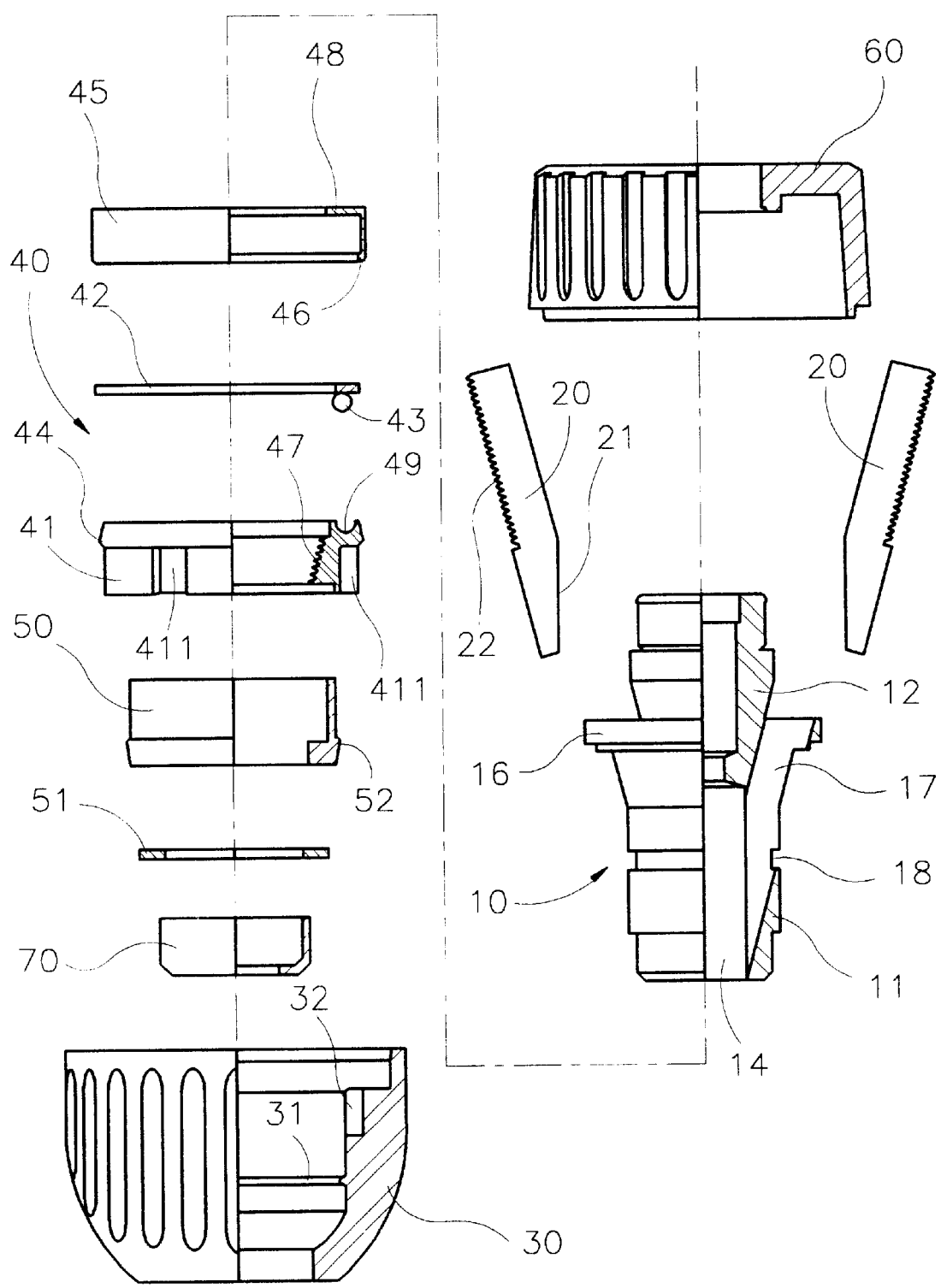
FIG. 1 is a view of the structural parts of the present invention in the first embodiment.

As shown in FIG. 1, the chuck of the present invention in the first embodiment mainly comprises: a main body 10, a plurality of jaws 20 inside the main body; a front cover 30, which is rotatably mounted on the main body 10; a threaded ring system 40 for moving the jaws 20 together or apart; a holding ring 50 for holding the threaded ring system 40, having a C-shaped washer 51; and a rear cover 60. The chuck of the present invention is mounted on an electrically or pneumatically driven shaft, which runs along a central axis. By turning the front cover 30 around the central axis the threaded ring system 40 is taken along, moving the jaws towards each other or apart, in order to grip a tool on the central axis or to release the tool.

Figure 2:
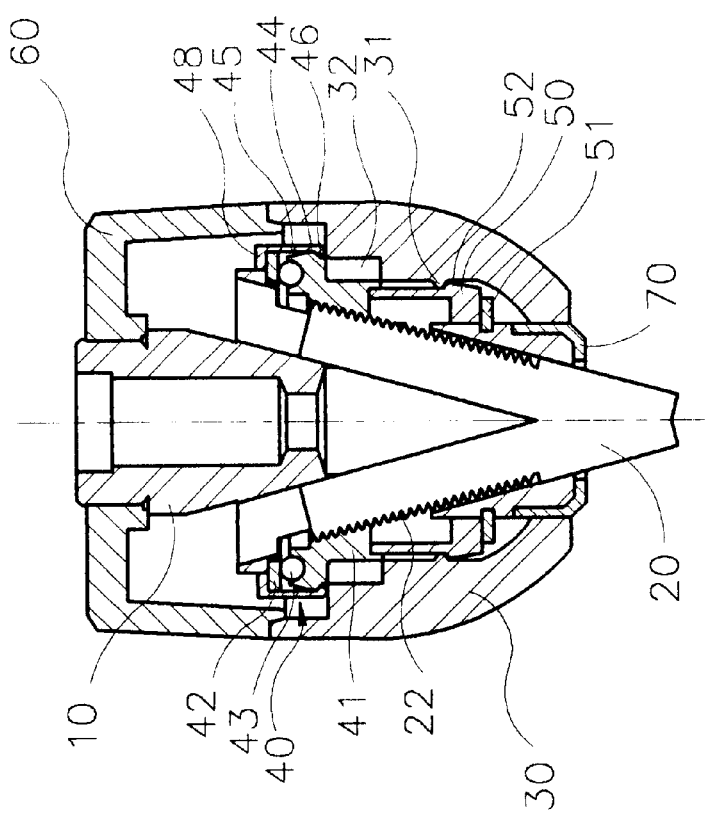
FIG. 2 is a sectional view of the present invention in the first embodiment.

Referring to FIGS. 1 and 2, the main body 10 is of roughly cylindrical shape and symmetrical with respect to the central axis, having a front part 11 and a rear part 12. The front part 11 has a front hole 14, which is concentric around the central axis and large enough to accommodate the widest tool to be held. The A rear part 12 has a rear hole, which is also concentric around the central axis and fits on the shaft (not shown). The main body 10 has a periphery, from which, between the front part 11 and the rear part 12, a holding projection 16 extends outward. Next to the holding projection 16, surrounding the front part 11, the threaded ring system 40 is mounted.

The main body 10 further has a plurality of guiding openings 17, which are evenly distributed around the periphery of the main body 10, passing therethrough at an oblique angle with the central axis. Each guiding opening 17 takes in one of the jaws 20. Each of the jaws 20 has a front end, which points towards the central axis near the front end of the main body 10, when the jaw 20 is inserted into one of the guiding openings 17. By gliding forward inside the guiding openings 17, the jaws 20 close in on the tool to grip the tool. By gliding backward inside the guiding openings 17, the jaws 20 release the tool. For this purpose, the jaws 20 are driven by turning the threaded ring system 40 around the central axis, as explained below.

Each of the jaws 20 has on the front end a gripping surface 21, which is formed to hold the shank of a tool, like a screw driver, a drill or a grinding wheel, which is thus positioned on the central axis. Each of the jaws 20 further has an outer surface, which points away from the central axis and into which several teeth 22 are cut. While the jaws are located inside the guiding openings 17, the teeth 22 are partly exposed outside the main body 10.

The threaded ring system 40 comprises a rotatable ring 41, a locking ring 42, several balls 43 between the rotatable ring 41 and the locking ring 42, and a coupling ring 45. As shown in FIGS. 1 and 2, the locking ring 42 leans against the main body 10 at the front side of the holding projection 16. Further towards the front end of the main body 10, the rotatable ring 41 is set on the locking ring 42, separated therefrom by the balls 43. The rotatable ring 41 is rotatable around the central axis and has an inner periphery with a thread 47. The thread 47 engages with the teeth 22 of the jaws 20, as far as the teeth 22 are exposed outside the main body 10. Turning the rotatable ring 41 drives the jaws 20 towards the central axis or away therefrom.

Referring to FIG. 2, the rotatable ring 41 has an outer periphery, which close to the rear side of the rotatable ring 41 has a ridge 44. The coupling ring 45 holds the rotatable ring 41 and the locking ring 42 together, surrounding the locking ring 42 and part of the rotatable ring 41. The coupling ring 45 has a front edge 46, which is slightly bent inward, holding the ridge 44 of the rotatable ring 41, and a rear flange 48 for enclosing the locking ring 42. Thus the rotatable ring 41, the locking ring 42 and the balls 43 are assembled to form the threaded ring system 40. The rotatable ring 41 further has a circular groove 49 on the rear side, which is concentric with the central axis and into which the balls 43 are laid.

The greatest improvement of the present invention lies in the in the way the front cover 30 is mounted in front of the threaded ring system 40, driving the threaded ring system 40. As shown in FIG. 1, the holding ring 50 is employed to hold the threaded ring system 40 and to ensure that the threaded ring system 40 leans against the holding projection 16. The holding ring 50 glides rotatably against the main body 10. An outer peripheral groove 18 is cut into the front part 11 of the main body 10. The C-shaped washer 51 is laid into the peripheral groove 18 for holding the holding ring 50 in its position, which in turn holds the threaded ring system 40 in its position. The front cover 30 is mounted on the holding ring 50, driving the threaded ring system 40, when turned. The front cover 30 has an inner diameter, which is slightly larger than the outer diameter of the holding ring 50 and the threaded ring system 40, allowing the front cover 30 to surround freely the holding ring 50 and the threaded ring system 40. Inside the front cover 30 a peripheral rim 31 extends inward. The holding ring 50 has an outer periphery with a peripheral ridge 52 at the front end thereof. The peripheral rim 31 has an inner diameter that is smaller than the outer diameter of the peripheral ridge 52, causing the front cover 30, once put on the holding ring 50, to be held thereon. Then the front cover 30 reaches to the rear cover 60, such that the main body 10 is almost completely enclosed.

Additionally, a protective cover 70 is put on the front end of the front part 11 to protect the inside of the main body 10 from dust and shreds from machining. The protective cover 70 is made of material that is resistant to wear.

For driving the threaded ring system 40, several incisions 411 are cut into the outer periphery thereof. Correspondingly, the front cover 30 has several blocking elements 32, allowing the front cover 30 to engage with the rotatable ring 41 and thus to take it along when turned, thereby driving the jaws 20 together or apart.

It is important to note that the inner diameter of the front cover 30 is slightly larger than the outer diameter of the threaded ring system 40. Furthermore, the widths of the incisions 411 are larger than the widths of the blocking elements 32. So the front cover 30 and the rotatable ring 41 are not tightly linked, allowing some play relative to each other.

The greatest characteristic of the present invention lies in simplifying the structure of the holding ring 50, facilitating the assembly of the chuck. Furthermore, since the front cover 30 is not tightly linked to the rotatable ring 41, but rather held by the holding ring 50, the position of which is more stable than the rotatable ring 41, the front cover is stably positioned on the main body 10 and will not shake along with the rotatable ring 41.

Figure 3:
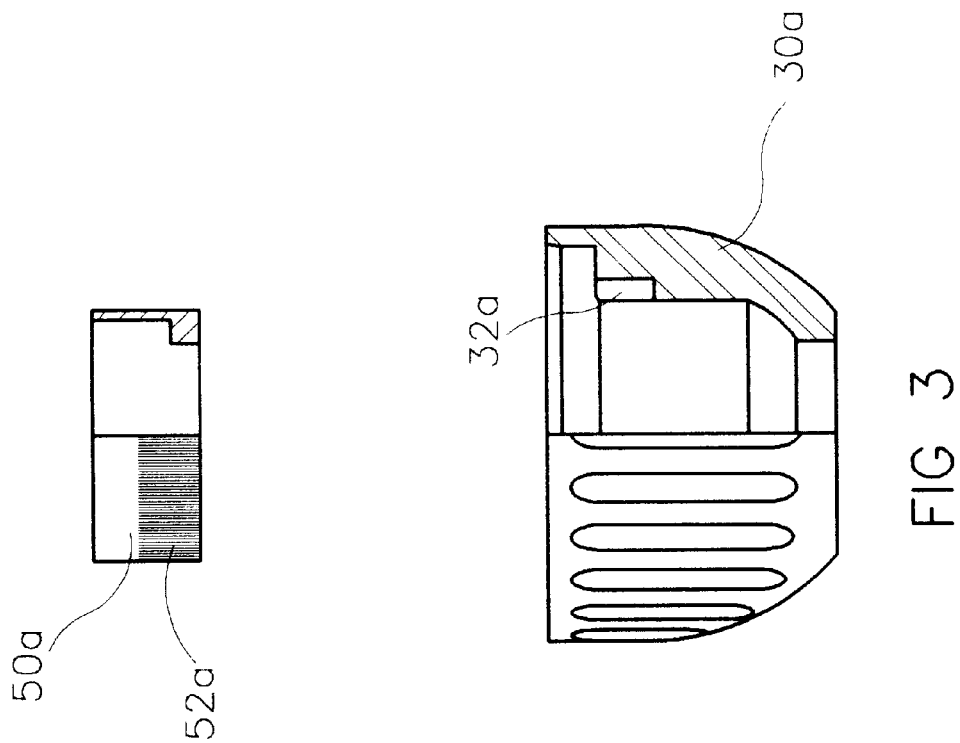
FIG. 3 is a sectional view of the front cover and the holding ring of the present invention in the second embodiment.

The present invention has further embodiments. Referring to FIG. 3, the chuck of the present invention in a second embodiment has a front cover 30a, which is tightly connected to a holding ring 50a. The holding ring 50a has an outer periphery with a grooved pattern 52a, grooved parallel to the central axis, for increased adhesion of the front cover 30a to the holding ring 50a.

Figure 4:
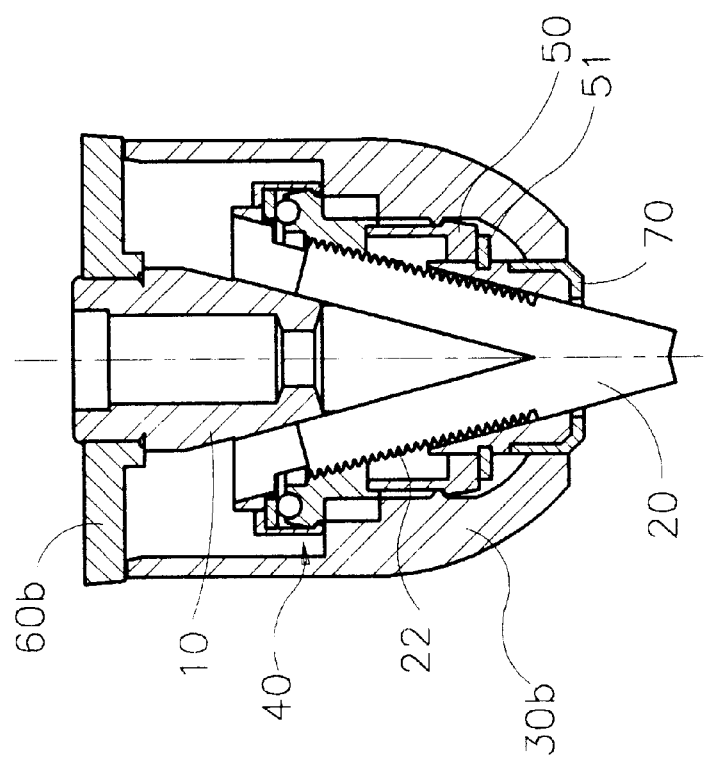
FIG. 4 is a sectional view of the present invention in the third embodiment.

Referring to FIG. 4, the chuck of the present invention in a third embodiment is operated by one hand, having a front cover 30b, which covers the main body 10 all the way to the rear side thereof. A rear plate 60b serves as a lid, covering the main body 10 from the rear side. For using the chuck of the present invention in the third embodiment, the user locks the shaft and then turns the front cover 30b with one hand to have the tool gripped or released.

Figure 5:
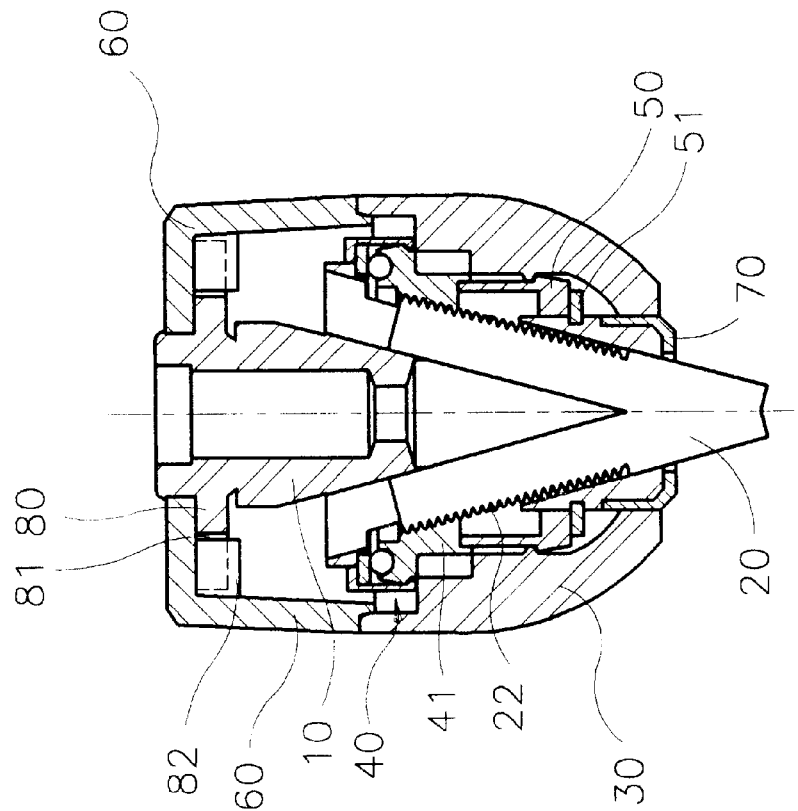
FIG. 5 is a sectional view of the present invention in the fourth embodiment.

Referring to FIG. 5, the chuck of the present invention in a fourth embodiment employs a modified way to fasten the rear cover 60. The main body 10 has on the rear end thereof a circular, outward extending rear plate 80. The rear plate 80 has an outer periphery with several incisions 81. Correspondingly, the rear cover 60 has several inward extending blocking elements 82. Thus the rear plate 80 and the rear cover 60 are connected. The rear plate 80 increases the stability of the chuck against pressure from the rear side.

While the invention has been described with reference to preferred embodiments thereof, it is to be understood that modifications or variations may be easily made without departing from the spirit of this invention which is defined by the appended claims.

We claim:

1. A chuck for holding a tool with a tip on a central axis, said chuck comprising:

a main body with a rear end and a front end pointing towards said tip of said tool, said main body surrounding said central axis and having a periphery with a holding projection, said periphery being passed through by several guiding openings which are symmetrically arranged around said central axis at equal mutual angular distances and oriented obliquely to said central axis;

a plurality of jaws, each of said jaws including a plurality of teeth and being glidingly placed in one of said guiding openings and having an outer side oriented away from said central axis;

a threaded ring system having a rotatable ring with a front side and a rear side, said rotatable ring being mounted on said main body and supported on said rear side by said holding projection, said main body symmetrically surrounding said central axis and rotatable around said central axis, said main body further having an inner periphery with a thread which engages with said teeth of said jaws, such that by turning said rotatable ring said jaws are driven towards said central axis or away therefrom;

a holding ring with a front side and a rear side mounted on said main body and symmetrically surrounding said central axis, said rear side of said holding ring supporting said rotatable ring on said front side thereof, said holding ring has an outer periphery with a ridge and said front cover on said inner periphery thereof has a rim, engaging with said ridge of said holding ring and blocking said front cover from being removed, a washer mounted on said main body to support said holding ring on said front side thereof; and a front cover covering said main body from said front end thereof, said front cover being tightly linked to said holding ring and having an inner periphery with coupling elements which engage with coupling elements on said rotatable ring, such that turning said front cover around said central axis drives a rotation of said threaded ring system around said central axis.

2. A chuck according to claim 1, wherein said threaded ring system further comprises:

a locking ring on said rear side of said rotatable ring, supported by said holding projection; and a plurality of balls between said rotatable ring and said locking ring.

3. A chuck according to claim 2, wherein said rotatable ring has an outer periphery and said threaded ring system further comprises:

a ridge, extending outward from said outer periphery of said rotatable ring close to said rear side thereof; and a coupling ring, surrounding said locking ring and partly said rotatable ring, having an inward bent front edge for holding said rotatable ring at said ridge to said locking ring.

4. A chuck according to claim 2, wherein said rotatable ring on said rear side thereof has a circular groove, into which said balls are laid to be guided.

5. A chuck according to claim 1, wherein said -main body on said rear end thereof is covered by a rear cover.

6. A chuck according to claim 5, wherein said main body on said rear end thereof has a circular, outward extending rear plate, having an outer periphery with coupling elements, which engage with coupling elements inside said rear cover.

7. A chuck for holding a tool with a tip on a central axis, said chuck comprising:

a main body with a rear end and a front end pointing towards said tip of said tool, said main body surrounding said central axis and having a periphery with a holding projection, said periphery being passed through by several guiding openings which are symmetrically arranged around said central axis at equal mutual angular distances and oriented obliquely to said central axis;

a plurality of jaws, each of said jaws including a plurality of teeth and being glidingly placed in one of said guiding openings and having an outer side oriented away from said central axis;

a threaded ring system having a rotatable ring with a front side and a rear side, said rotatable ring being mounted on said main body and supported on said rear side by said holding projection, said main body symmetrically surrounding said central axis and rotatable around said central axis, said main body further having an inner periphery with a thread which engages with said teeth of said jaws, such that by turning said rotatable ring said jaws are driven towards said central axis or away therefrom:

a holding ring with a front side and a rear side mounted on said main body and symmetrically surrounding said central axis, said rear side of said holding ring supporting said rotatable ring on said front side thereof;

a washer mounted on said main body to support said holding ring on said front side thereof; and a front cover covering said main body from said front end thereof, said front cover being tightly linked to said holding ring and having an inner periphery with coupling elements which engage with coupling elements on said rotatable ring, such that turning said front cover around said central axis drives a rotation of said threaded ring system around said central axis, and said front cover is pressed onto said holding ring and said holding ring has an outer periphery with a grooved pattern parallel to said central axis to increase adhesion of said front cover.

* * * * *